(12) United States Patent
Aoki

(10) Patent No.: US 9,573,588 B2
(45) Date of Patent: Feb. 21, 2017

(54) CONTROL DEVICE FOR HYBRID VEHICLE

(75) Inventor: Takanori Aoki, Nissin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 157 days.

(21) Appl. No.: 14/397,895

(22) PCT Filed: May 15, 2012

(86) PCT No.: PCT/JP2012/062380
§ 371 (c)(1),
(2), (4) Date: Oct. 30, 2014

(87) PCT Pub. No.: WO2013/171841
PCT Pub. Date: Nov. 21, 2013

(65) Prior Publication Data
US 2015/0134166 A1 May 14, 2015

(51) Int. Cl.
B60W 10/08 (2006.01)
B60W 20/00 (2016.01)
B60W 10/06 (2006.01)
B60K 6/445 (2007.10)
B60K 6/48 (2007.10)
B60W 10/02 (2006.01)
B60W 10/26 (2006.01)

(52) U.S. Cl.
CPC .............. *B60W 20/50* (2013.01); *B60K 6/445* (2013.01); *B60K 6/48* (2013.01); *B60W 10/02* (2013.01); *B60W 10/06* (2013.01); *B60W 10/08* (2013.01); *B60W 10/26* (2013.01); *B60W 20/00* (2013.01); *B60W 2710/0627* (2013.01); *B60W 2710/0638* (2013.01); *B60Y 2300/64* (2013.01); *B60Y 2400/435* (2013.01); *Y02T 10/6221* (2013.01); *Y02T 10/6239* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 7,946,118 B2* | 5/2011 | Hippen | ................... | F01M 11/02 184/6.16 |
| 2004/0194466 A1* | 10/2004 | Kawamura | .............. | F02B 33/34 60/612 |
| 2007/0033938 A1* | 2/2007 | Ueno | .................... | F02B 37/004 60/612 |
| 2010/0263639 A1* | 10/2010 | Uhrich | ................ | F02D 41/0007 123/564 |

(Continued)

FOREIGN PATENT DOCUMENTS

| | | |
|---|---|---|
| JP | 2001182580 A | 7/2001 |
| JP | 2003-003899 A | 1/2003 |

(Continued)

*Primary Examiner* — John R Olszewski
*Assistant Examiner* — Navid Ziaeianmehdizadeh
(74) *Attorney, Agent, or Firm* — Sughrue Mion, PLLC

(57) ABSTRACT

When an engine is stopped in a state in which a supercharger is overheated (step S21: YES), a control device performs rotation processing for rotating a crankshaft of the engine under a condition in which the supply of fuel to the engine is stopped (step S23). After the rotation processing is ended (step S25: YES), the control device performs engine stop processing for stopping the rotation of the crankshaft (step S29).

6 Claims, 5 Drawing Sheets

(56) References Cited

U.S. PATENT DOCUMENTS

| | | | | |
|---|---|---|---|---|
| 2010/0300405 A1* | 12/2010 | Uhrich | ............... | F02B 33/40 |
| | | | | 123/435 |
| 2014/0080662 A1* | 3/2014 | Jehle | ............... | B60K 6/485 |
| | | | | 477/3 |
| 2014/0100729 A1* | 4/2014 | Jung | ............... | F02D 41/042 |
| | | | | 701/22 |
| 2015/0361905 A1* | 12/2015 | Lofgren | ............... | B60K 6/24 |
| | | | | 417/34 |
| 2016/0153350 A1* | 6/2016 | Pappenheimer | ............... | F02B 37/10 |
| | | | | 60/608 |

FOREIGN PATENT DOCUMENTS

| | | |
|---|---|---|
| JP | 2003-328799 A | 11/2003 |
| JP | 2009-173124 A | 8/2009 |
| JP | 2010-174775 A | 8/2010 |
| JP | 2011-051479 A | 3/2011 |

* cited by examiner

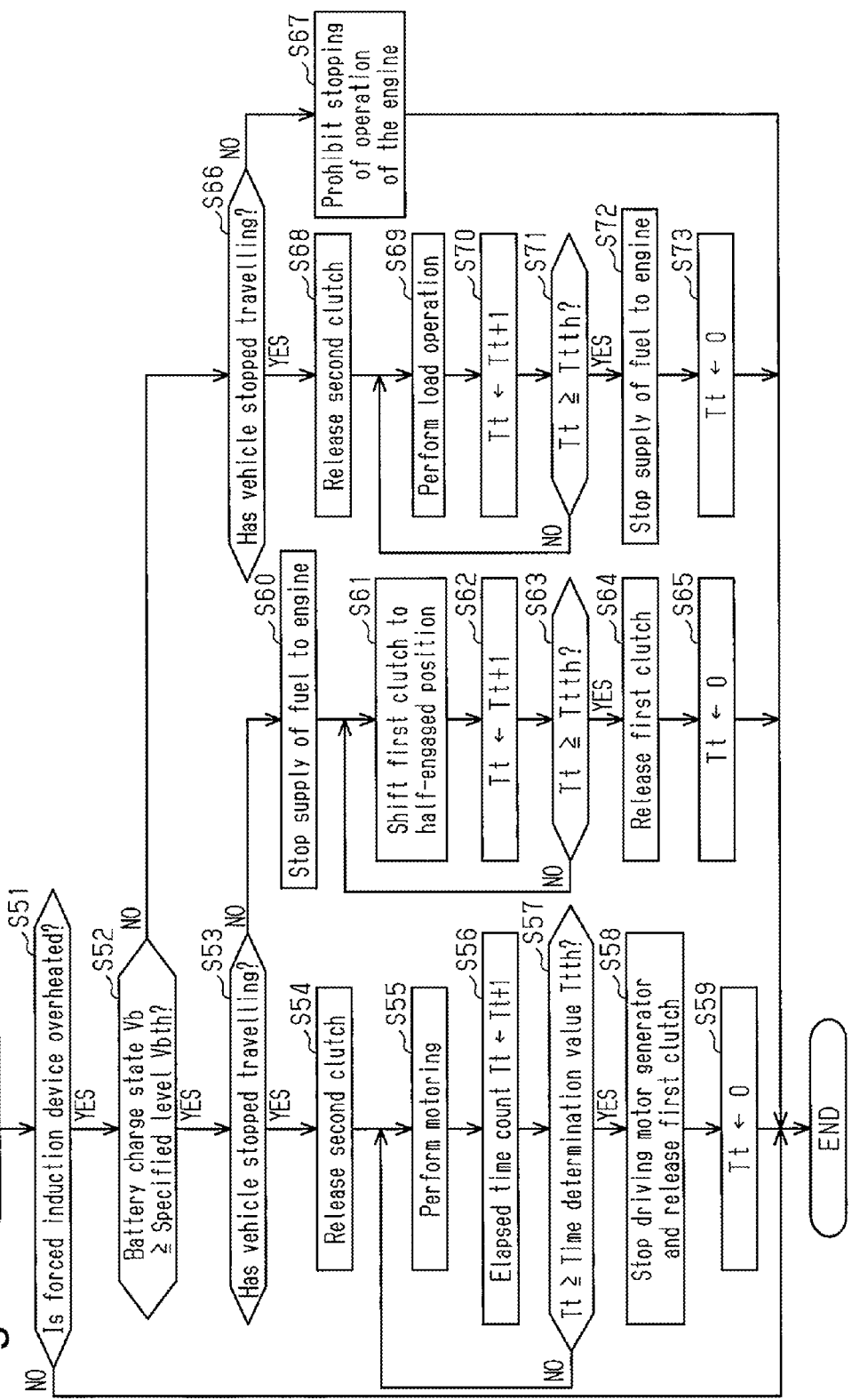

CONTROL DEVICE FOR HYBRID VEHICLE

CROSS REFERENCE TO RELATED APPLICATIONS

This application is a National Stage of International Application No. PCT/JP2012/062380, filed May 15, 2012, the contents of all of which are incorporated herein by reference in their entirety.

TECHNICAL FIELD

The present invention relates to a controller for a hybrid vehicle provided with an engine including an exhaust gas type forced induction device.

BACKGROUND ART

In recent years, a hybrid vehicle provided with an engine including an exhaust gas type forced induction device that uses the energy of exhaust gas to pressurize the intake air has been developed. When the hybrid vehicle is travelling, the engine may be requested to stop even when the boost pressure produced by the forced induction device is high. In such a case, immediately after the supply of fuel to the engine is stopped in accordance with the request, the turbine wheel of the forced induction device continues to rotate for a while in the exhaust passage of the engine due to inertia. In such a case, gas having a high oxygen concentration is continuously supplied to a catalyst, which is located in the exhaust passage. This may increase the oxygen adsorption amount of the catalyst and lower the purification capacity of the catalyst.

Patent document 1 discloses a method for limiting decreases in the purification capacity of the catalyst. In this method, when stopping an engine as requested, the boost pressure produced by the forced induction device is lowered to decrease the rotation speed of the turbine wheel before stopping the supply of fuel to the engine. Accordingly, the rotation speed of the turbine wheel rotated by inertia immediately after the engine is stopped becomes low, and the amount of high oxygen concentration gas supplied to the catalyst is reduced. This limits decreases in the purification capacity of the catalyst.

In a hybrid vehicle provided with an engine including an exhaust gas type forced induction device, components of the forced induction device and the peripheral components of the forced induction device may become overheated if the engine is stopped while the vehicle is travelling. To avoid stopping of the engine when the forced induction device is overheated, operation of the engine is continued for a predetermined period from when the engine is requested to stop before stopping the supply of fuel to the engine. This stops the rotation of the engine crankshaft when the forced induction device is no longer overheated.

PRIOR ART DOCUMENT

Patent Document

Patent Document 1: Japanese Laid-Open Patent Publication No. 2003-328799

DISCLOSURE OF THE INVENTION

Problem to be Solved by the Invention

One advantage of the hybrid vehicle is in that fuel consumption can be reduced by appropriately stopping the supply of fuel to the engine even when the vehicle is travelling. As described above, by continuously operating the engine for a predetermined period from when the engine is requested to stop before stopping the operation of the engine, the components of the forced induction device and the peripheral components of the forced induction device can be protected. However, this would reduce the opportunities for stopping the supply of fuel to the engine, and the fuel consumption amount may not be sufficiently reduced.

In particular, in a hybrid vehicle capable of travelling in an EV mode in which the operation of the engine is stopped and a motor is driven, the operation of the engine is frequently stopped due to the shifting from an HV mode in which the engine operates to the EV mode. Thus, the operation of the engine is often stopped when the temperature of the forced induction device is high. This lowers the durability of the forced induction device. To maintain the durability of the forced induction device, a cooling device may be added to cool the forced induction device even when the engine is not operating. However, the cooling device would increase the number of components. Here, "EV" is the acronym for "Electric Vehicle", and "HV" is the acronym for "Hybrid Vehicle".

It is an object of the present invention to provide a controller for a hybrid vehicle capable of suppressing overheating of a forced induction device without increasing the fuel consumption of the vehicle.

Means for Solving the Problem

The means for solving the above problem and the effects of the means will now be described.

One aspect of the present invention is a controller for a hybrid vehicle provided with an engine including an exhaust gas type forced induction device and a motor coupled to an output shaft of the engine. The controller is configured so that if the controller stops the engine under a situation in which the forced induction device is overheated, before stopping the engine, the controller performs a rotation process that rotates the output shaft under a condition in which supply of fuel to the engine is stopped. The phrase "stopping of the engine" means stopping the rotation of the output shaft of the engine.

According to such a configuration, when the forced induction device is overheated, the supply of fuel to the engine is stopped and a rotation process for rotating the output shaft of the engine is performed. The forced induction device is then cooled by the air flowing through the exhaust passage of the engine in the rotation process. This limits overheating of the forced induction device without increasing the fuel consumption of the vehicle.

Preferably, the rotation process includes motoring that rotates the output shaft with the motor under the condition that the supply of fuel to the engine is stopped.

The hybrid vehicle includes one or more motors serving as the motor. In the controller of such a hybrid vehicle, when shifting a travelling mode of the vehicle from a first travelling mode, which drives the vehicle with the engine, to a second travelling mode, which stops the supply of fuel to the engine and drives the vehicle with the motor, under a situation in which the forced induction device is overheated when the vehicle is travelling. Preferably, when shifting from the first travelling mode to the second travelling mode, the controller performs the motoring until a predetermined period elapses from when the travelling mode is shifted.

In the hybrid vehicle, a request to stop the engine may be issued while the vehicle is travelling. In such case, if the forced induction device is overheated, the motoring is performed until a predetermined period elapses from when shifting from the first travelling mode to the second travelling mode. Then, the rotation of the output shaft of the engine is stopped. Thus, even when the hybrid vehicle is travelling, overheating of the forced induction device may be limited without increasing the fuel consumption of the vehicle.

The hybrid vehicle may include a motor used to drive the vehicle and a motor used for the motoring that differs from the motor used to drive the vehicle. When a request to stop the engine is issued while the vehicle is travelling in the hybrid vehicle, the motoring that rotates the output shaft of the engine with the motor for motoring is performed while driving the vehicle with the motor used to drive the vehicle. Since the forced induction device is cooled by the air flowing through the exhaust passage of the engine during the motoring, overheating of the forced induction device may be limited without increasing the fuel consumption of the vehicle.

In a hybrid vehicle including a motor used to drive the vehicle and a motor used for the motoring, the motor used for the motoring has a power generating function for generating power with torque of the engine, and the power generated by the motor is stored in a battery. Preferably, in the controller for such a hybrid vehicle, when stopping the engine under a situation in which the forced induction device is overheated, if a state of charge of the battery is lower than a specified level, the controller preferably performs a load operation with the engine to have the motor used for motoring generate power with the torque of the engine before stopping the supply of fuel to the engine to stop the engine.

The state of charge of the battery is lowered by the motor used for motoring when performing motoring. If the motoring is performed when the state of charge of the battery is low, the battery may become over-discharged. Thus, if the state of charge of the battery is higher than or equal to the specified level, the motoring is performed, and the rotation of the output shaft of the engine is stopped. If the state of charge of the battery is lower than the specified level, instead of the motoring, a load operation is performed so that the motor used for motoring generates power with the torque of the engine. The power generated by the motor used for motoring in the load operation is stored in the battery. Subsequently, the supply of fuel to the engine is stopped, and the rotation of the output shaft of the engine is stopped. Thus, when the state of charge of the battery is low, fuel is consumed in a manner irrelevant to the driving of the vehicle. However, the temperature of the forced induction device can be lowered while raising the state of charge of the battery.

A hybrid vehicle may include a clutch capable of varying efficiency for transmitting torque from the motor to the output shaft of the engine. When stopping the engine under a situation in which the forced induction device is overheated, the controller of such a hybrid vehicle preferably performs the motoring that transmits torque from the motor to the output shaft through the clutch under the condition that the supply of fuel to the engine is stopped, and then prohibits the transmission of torque from the motor to the output shaft through the clutch to stop the engine. Thus, when the motoring is performed, the output shaft of the engine is rotated by the torque of the motor. Since the forced induction device is cooled by the air flowing through the exhaust passage of the engine during the motoring, overheating of the forced induction device is limited without increasing the fuel consumption of the vehicle.

In a hybrid vehicle including a clutch, the motor may have a power generating function for generating power with torque of the engine. In such a hybrid vehicle, the power generated by the motor is stored in a battery. Preferably, if a state of charge of the battery is lower than a specified level when the hybrid vehicle is travelling, the controller prohibits stopping of the supply of fuel to the engine. During the travelling of the hybrid vehicle, the first travelling mode is continued while the state of charge of the battery is smaller than the specified level. However, the stopping of the operation of the engine may be permitted when the state of charge of the battery becomes greater than or equal to the specified level by the power generation of the motor involved in the operation of the engine, and the like.

When stopping the engine under a situation in which the forced induction device is overheated and the vehicle stops travelling, if a state of charge of the battery is lower than a specified level, the controller preferably perform a load operation with the engine to have the motor generate power with the torque of the engine before stopping the supply of fuel to the engine to stop the engine.

Accordingly, even if the state of charge of the battery is lower than the specified level, the load operation of causing the motor to generate power with the torque from the engine is performed while the hybrid vehicle is stopped. The power generated by the motor in the load operation is stored in the battery. Subsequently, the supply of fuel to the engine is stopped, and the rotation of the output shaft of the engine is stopped. Thus, when the state of charge of the battery is low, the fuel is consumed in a manner irrelevant to the driving of the vehicle. However, the temperature of the forced induction device can be lowered while increasing the state of charge of the battery.

Preferably, the determination of whether or not the probability of the forced induction device being overheated is high is based on an operation status of the forced induction device.

BRIEF DESCRIPTION OF THE DRAWINGS

FIG. 5 is a flowchart illustrating An engine stop pre-processing routine of the second embodiment.

EMBODIMENTS OF THE INVENTION

First Embodiment

One embodiment of the present invention will now be described with reference to FIGS. 1 to 3.

Figure 1:
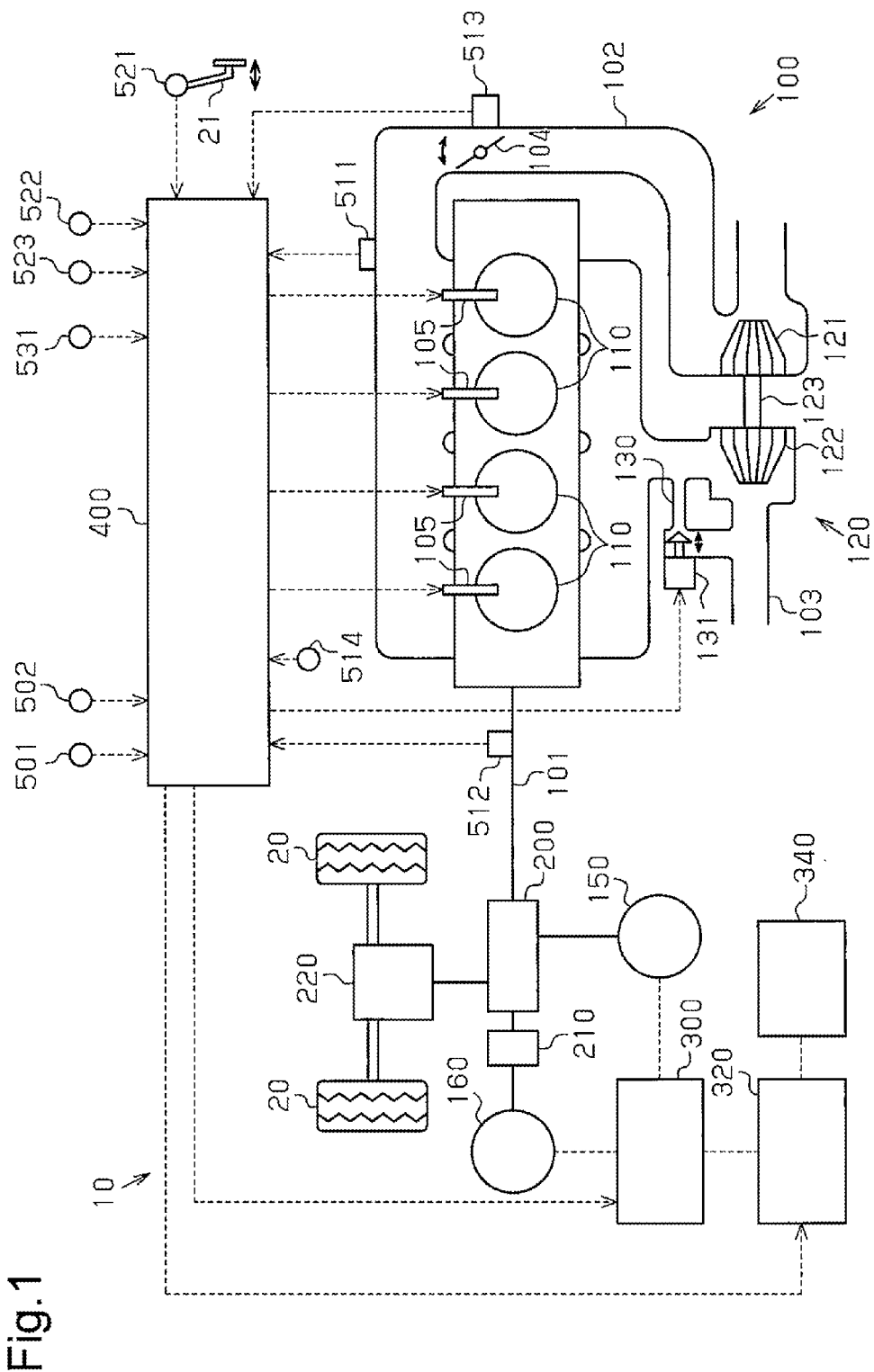
FIG. 1 is a schematic diagram showing a hybrid vehicle and a controller of the hybrid vehicle according to a first embodiment of the present invention.

As shown in FIG. 1, a hybrid system 10 of a hybrid vehicle includes an engine 100, a first motor generator 150 serving as a motoring motor, and a second motor generator 160 serving as a motor used to drive the vehicle. The hybrid system 10 includes a power dividing mechanism 200 formed by a planetary gear train. A crankshaft 101, which is an output shaft of the engine 100, and the first motor generator 150 are coupled to the power dividing mechanism 200. In other words, the power output from the engine 100 is transmitted to the first motor generator 150 by the power dividing mechanism 200.

The second motor generator 160 is coupled to the power dividing mechanism 200 by a reduction gear 210 formed by a planetary gear train. Further, drive wheels 20 are also coupled to the power dividing mechanism 200 by a speed reducing mechanism 220. At least either one of the power from the engine 100 and the power from the second motor generator 160 is transmitted to the speed reducing mechanism 220 by the power dividing mechanism 200.

The engine 100 of the present embodiment includes an exhaust gas type forced induction device 120 capable of regulating the boost pressure. An intake passage 102 and an exhaust passage 103 are connected to a combustion chamber 110 of each cylinder in the engine 100. The intake passage 102 includes a throttle valve 104 that regulates the amount of intake air, which is the amount of intake air drawn into the combustion chamber 110. A compressor wheel 121 of the forced induction device 120 is arranged at the upstream side of the throttle valve 104 in the intake passage 102. A turbine wheel 122 of the forced induction device 120 is arranged in the exhaust passage 103. The compressor wheel 121 is coupled to the turbine wheel 122 by a rotation shaft 123 and rotates integrally with the turbine wheel 122. Furthermore, a bypass passage 130 is formed in the exhaust passage 103 to bypass the turbine wheel 122. A waste gate valve 131 is arranged in the bypass passage 130 to regulate the flow rate of the exhaust gas flowing toward the turbine wheel 122.

In the combustion chamber 110 of each cylinder, a mixture of fuel, which is injected from an injector 105, and intake air is burned, and a power corresponding to the combustion is output to the crankshaft 101. The burned gas is discharged as exhaust gas to the exhaust passage 103. The energy of the exhaust gas discharged to the exhaust passage 103 rotates the turbine wheel 122. This rotates and drives the compressor wheel 121. The intake air compressed by the compressor wheel 121 is drawn into each combustion chamber 110 through the intake passage 102. When the intake air amount is increased by the forced induction of the forced induction device 120, the amount of fuel injected the injector 105 is also increased. This increases the engine torque, which is the torque of the engine 100, as compared to when the forced induction device 120 is not driven.

The rotation speed of the turbine wheel 122 is changed by controlling the opening of the waste gate valve 131 and regulating the amount of exhaust gas passing through the bypass passage 130. In other words, the boost pressure is regulated to correspond to the opening of the waste gate valve 131.

Each of the first and second motor generators 150 and 160 is a known synchronous generator motor including a rotor, in which a permanent magnet is embedded, and a stator, which a three-phase coil is wound around. Each of the first and second motor generators 150 and 160 is connected to a battery 340 by of an inverter 300 and a converter 320. Alternating current generated by the first motor generator 150 is converted to direct current by the inverter 300. Then, the voltage of the direct current is decreased by the converter 320 and used to charge the battery 340. When starting the engine 100, the voltage of the direct current supplied from the battery 340 is increased by the converter 320 and then converted to alternating current by the inverter 300. The alternating current is then supplied to the first motor generator 150.

The second motor generator 160 is connected to the battery 340 by the inverter 300 and the converter 320 like the first motor generator 150. When the vehicle starts to move, which the vehicle is moving at a low speed, and when the vehicle accelerates, the voltage of the direct current supplied from the battery 340 is increased by the converter 320 and then converted to alternating current by the inverter 300. The alternating current is supplied to the second motor generator 160.

The first motor generator 150 functions as a starter motor, which cranks the engine 100 when starting the engine 100, and also functions as a power generator, which generates power using the power of the engine 100 when the engine 100 is operating. When the vehicle is stably travelling and when the vehicle is accelerating, the alternating current generated by the first motor generator 150 is supplied to the second motor generator 160 through the inverter 300. When the second motor generator 160 is driven by the alternating current supplied in such a manner, the power of the second motor generator 160 is transmitted to the drive wheel 20 by the reduction gear 210, the power dividing mechanism 200, and the speed reducing mechanism 220.

Furthermore, when the vehicle decelerates, the second motor generator 160 is driven when the power from the drive wheels 20 is transmitted through the speed reducing mechanism 220, the power dividing mechanism 200, and the reduction gear 210. In this case, the second motor generator 160 functions as the power generator and generates power to convert the power transmitted from the drive wheel 20 to the second motor generator 160 to electric power. The electric power converted in such manner is converted from alternating current to direct current by the inverter 300. The voltage of the direct current is decreased by the converter 320 and used to charge to the battery 340. In other words, when the vehicle decelerates, kinetic energy is converted to electric energy and stored in the battery 340 to recover energy.

A controller 400 that controls the hybrid system 10 will now be described.

The controller 400 of the present embodiment includes a power management control computer, which entirely controls the hybrid system 10, and control units, which are capable of communicating with the power management control computer. In other words, the controller 400 functions as a control section and includes the control units of a battery monitoring unit that monitors the state of charge or the like of the battery 340, a motor control unit that controls each of the first and second motor generators 150 and 160, and an engine control unit that controls the engine 100.

A first rotation sensor 501, which detects the rotation speed of the first motor generator 150, and a second rotation sensor 502, which detects the rotation speed of the second motor generator 160, are electrically connected to the controller 400. The controller 400 controls each of motor generators 150 and 160 through the inverter 300 and the converter 320 based on an output request set for the motor generators 150 and 160 and the rotation speeds detected from the detection signals of the rotation sensors 501 and 502.

An air flowmeter 511, which detects the intake air amount, and a crank position sensor 512, which detects the engine speed that is the rotation speed of the crankshaft 101 of the engine 100, are also electrically connected to the controller 400. Furthermore, a throttle position sensor 513, which detects the open degree of the throttle valve 104, a boost pressure sensor 514, which detects the boost pressure produced by the forced induction device 120, and the like are electrically connected to the controller 400. In accordance with a set output request for the set engine 100 and the intake air amount, the engine speed, the open degree of the throttle valve 104, and the boost pressure detected from the detection signals of the sensors 511, 512, 513, and 514, the controller 400 executes fuel injection control, ignition timing control, and intake air amount control on the engine 100 and boost pressure control on the forced induction device 120.

An accelerator position sensor 521, which detects an accelerator depression amount that is the amount of an accelerator pedal 21 depressed by the driver, a shift position sensor 522, which detects the position of a shift lever, a vehicle speed sensor 523, which detects vehicle speed, and the like are also electrically connected to the controller 400. The controller 400 calculates a request torque that is to be output from the power dividing mechanism 200 to the speed reducing mechanism 220 based on the accelerator depression amount and the vehicle speed detected from the detection signals of the sensors 521 and 523 to control the engine 100 and each of the first and second motor generators 150 and 160 so that the request power corresponding to the request torque is output to the speed reducing mechanism 220.

The control of the engine 100 and each of the first and second motor generators 150 and 160 executed by the controller 400 will now be described in detail.

The controller 400 sets a target rotation speed and a target engine torque to control the engine 100 so that the engine speed and the engine torque become equal to the target rotation speed and the target engine torque. The target rotation speed and the target engine torque are set in the following manner. A travelling request power of the engine 100 and a request torque that is to be output to the speed reducing mechanism 220 as a drive torque requested to the vehicle are set based on the accelerator depression amount and the vehicle speed. A charging/discharging request power from the battery 340 to the engine 100 is calculated based on the state of charge of the battery 340. Then, the total request power of the engine 100 is calculated as a sum of the travelling request power, which is based on the accelerator depression amount and the vehicle speed, and the charging/discharging request power of the battery 340. The total request power is applied to an optimum fuel consumption map stored in the controller 400 to determine the target rotation speed and the target engine torque of the engine 100.

The controller 400 feedback-controls the power generation torque of the first motor generator 150 so that the engine speed becomes equal to the target rotation speed. The controller 400 determines the target motor torque and the target rotation speed of the second motor generator 160 so that a lacking torque, which is obtained by subtracting the power generation torque of the first motor generator 150 from the preset request torque that is to be output to the speed reducing mechanism 220, is assisted by the second motor generator 160. The controller 400 controls the second motor generator 160 based on the determined target motor torque and the target rotation speed.

In the manner described above, some of the power from the engine 100 is used to drive the first motor generator 150, and the electric power generated at the first motor generator 150 is used to drive the second motor generator 160 so that the power from the engine 100 and the power from the second motor generator 160 are transmitted to the drive wheels 20. In this manner, some of the power from the engine 100 is distributed to the first motor generator 150, and the power from the second motor generator 160 is used to assist driving of the drive wheels 20. As a result, the engine speed is adjusted so that the request power is obtained while operating the engine 100 in an efficient operation region.

The controller 400 supplies electric power from the battery 340 to the second motor generator 160 when the request power is large such as when the vehicle is accelerating. This increases the assist amount with the second motor generator 160 and inputs a greater power to the speed reducing mechanism 220.

Furthermore, if the state of charge of the battery 340 is low, the controller 400 increases the operation amount of the engine 100 and increases the amount of power generated by the first motor generator 150 to supply electric power to the battery 340. In this case, the controller 400 may increase the boost pressure produced by the forced induction device 120 in order to increase the operation amount of the engine 100. If, on the other hand, the state of charge of the battery 340 is high enough, the controller 400 may stop the operation of the engine 100 and output power, which is for obtaining the request power, to the speed reducing mechanism 220 only from the second motor generator 160.

In the present embodiment, if the target rotation speed and the target engine torque of the engine 100 need to be raised based on the operation condition of the engine 100 set as described above, the controller 400 sets a target boost pressure to perform forced induction with the forced induction device 120 or controls the forced induction device 120 to increase the target boost pressure produced by the forced induction device 120. Specifically, when the acceleration request of the vehicle is high and the state of charge of the battery 340 is not that high, a large total request power of the engine 100 is calculated. In such a case, the controller 400 sets a large value for the target boost pressure produced by the forced induction device 120. If, on the other hand, the total request power of the engine 100 is not that large, the controller 400 sets a small value for the target boost pressure produced by the forced induction device 120 or stops forced induction with the forced induction device 120.

When controlling the forced induction device 120, the controller 400 basically controls the forced induction device 120 so that the boost pressure detected from the detection signal of the boost pressure sensor 531 becomes equal to the target boost pressure. Specifically, the controller 400 adjusts the opening of the waste gate valve 131 to adjust the amount of exhaust gas flowing toward the turbine wheel 122.

The forced induction device 120 tends to overheat as the rotation speed of the turbine wheel 122 and the compressor wheel 121 increases. Thus, in the hybrid vehicle, the request to stop the operation of the engine 100 may be issued when components such as the turbine wheel 122 of the forced induction device 120 and peripheral components such as bearings that support the turbine wheel 122 are overheated when the forced induction device 120 is driven.

To protect the forced induction device 120, it is preferred that the crankshaft 101 of the engine 100 be rotated and the rotation of the crankshaft 101 then be stopped to lower the temperature of the forced induction device 120. The rotation of the crankshaft 101 causes gas to flow in the exhaust passage 103, and the flow of gas cools the forced induction device 120. Furthermore, the rotation of the crankshaft 101 continuously drives an engine-driven pump so that oil and coolant are circulated in the engine 100. The circulation of oil and coolant also cools the forced induction device 120.

Various types of processing routines executed by the controller 40 to protect the forced induction device 120 will now be described.

First, a determination processing routine for determining whether or not the forced induction device 120 is overheated will now be described with reference to the flowchart of FIG. 2.

Figure 2:
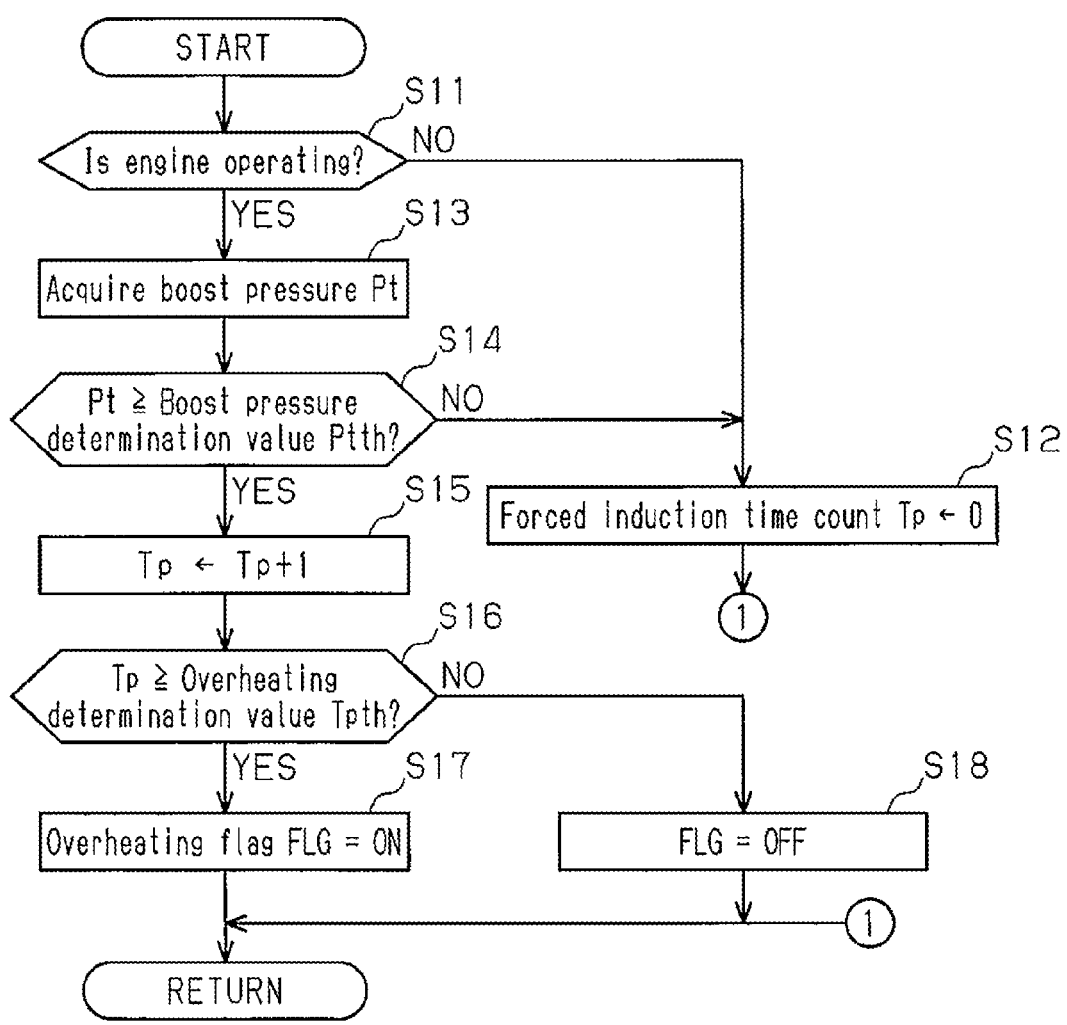
FIG. 2 is a flowchart illustrating a determination processing routine of the first embodiment.

The determination processing routine shown in FIG. 2 is a processing routine executed in predetermined cycles. In the determination processing routine, the controller 400 determines whether or not the engine 100 is operating, that is, whether or not fuel is being supplied to the engine 100 (step S11). If the operation of the engine 100 has stopped (step S11: NO), the controller 400 resets a forced induction time count Tp to "0" (step S12) and temporarily terminates the determination processing routine. If the engine 100 is operating (step S11: YES), the controller 400 acquires the boost pressure Pt from the detection signal of the boost pressure sensor 531 (step S13), and determines whether or not the boost pressure Pt is greater than or equal to a boost pressure determination value Ptth (step S14). The boost pressure determination value Ptth is a preset value serving as a reference to determine whether or not the forced induction device 120 is being driven.

If the boost pressure Pt is less than the boost pressure determination value Ptth (step S14: NO), the controller 400 determines that the forced induction device 120 is not driven and proceeds to step S12, which is described above. If the boost pressure Pt is greater than or equal to the boost pressure determination value Ptth (step S14: YES), the controller 400 determines that the forced induction device 120 is being driven and increments the forced induction time count Tp by "1" (step S15). Then, the controller 400 determines whether or not the forced induction time count Tp is greater than or equal to an overheating determination value Tpth (step S16). It is presumed that the forced induction device 120 is likely to overheat when driven over a long time. Thus, in the present embodiment, the overheating determination value Tpth is set so that overheating of forced induction device 120 can be determined from the duration of the forced induction performed by the forced induction device 120.

If the forced induction time count Tp is greater than or equal to the overheating determination value Tpth (step S16: YES), the controller 400 determines that the forced induction device 120 is overheated, sets an overheating flag FLG to ON (step S17), and then temporarily terminates the determination processing routine. If the forced induction time count Tp is less than the overheating determination value Tpth (step S16: NO), the controller 400 determines that the forced induction device 120 is not overheated, sets the overheating flag FLG to OFF (step S18), and temporarily terminates the determination processing routine.

The overheating flag FLG is set to OFF in a processing routine executed when starting the engine 100.

An engine stop pre-processing routine executed by the controller 400 when a request to stop the operation of the engine 100 is issued will now be described with reference to the flowchart of FIG. 3. The request to stop the operation of the engine 100 is issued not only when the vehicle is stopped but also when the vehicle is travelling. More specifically, a request to stop operation is also issued when the travelling mode of the vehicle shifts from a first travelling mode, which uses the engine torque of the engine 100, to a second travelling mode, which uses only the motor torque of the second motor generator 160. When the travelling mode is in the first travelling mode, the vehicle may be driven with only the engine torque or with the engine torque and the motor torque.

Figure 3:
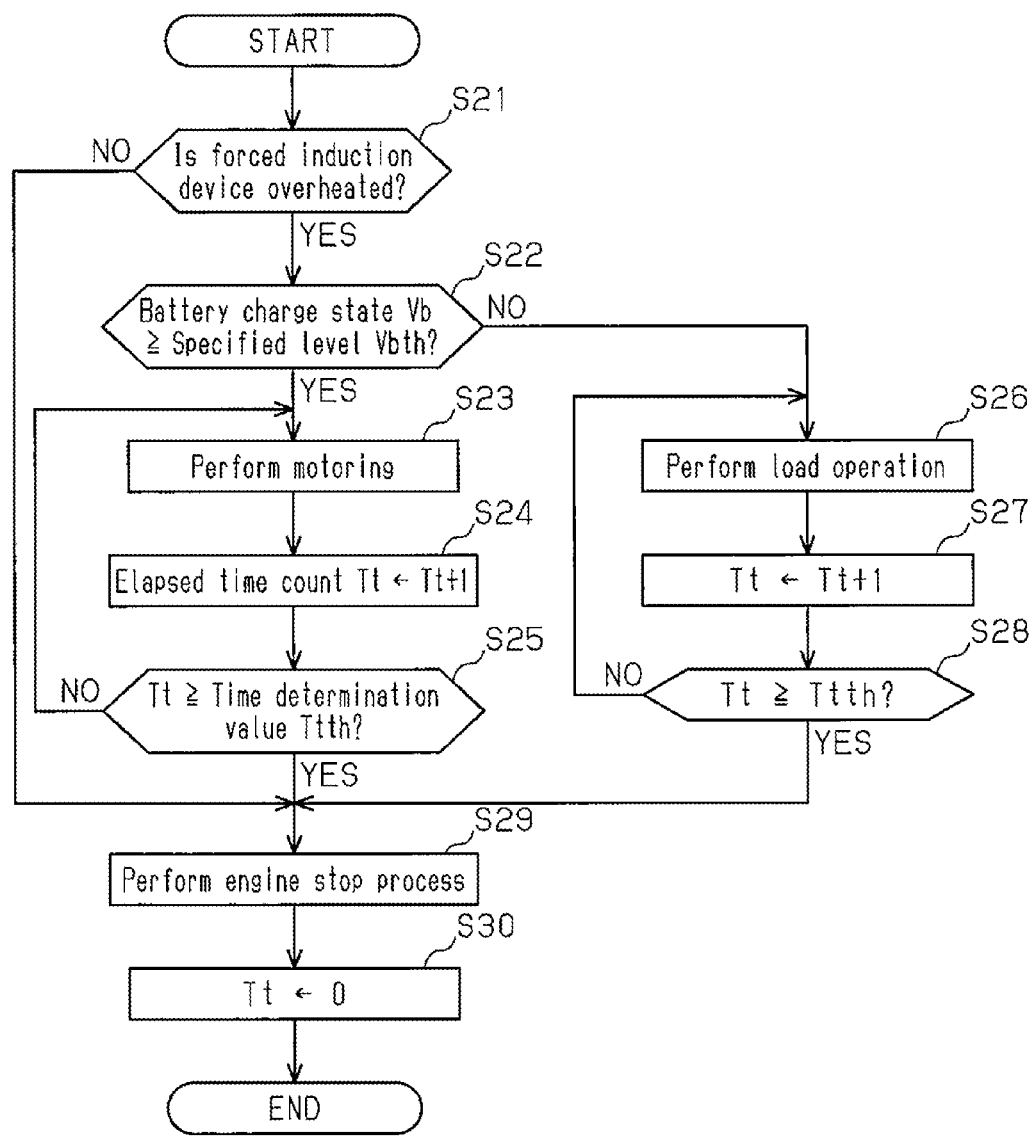
FIG. 3 is a flowchart illustrating An engine stop pre-processing routine of the first embodiment.

In the engine stop pre-processing routine shown in FIG. 3, the controller 400 determines whether or not the forced induction device 120 is overheated (step S21). In the present embodiment, the controller 400 determines that the forced induction device 120 is overheated when the overheating flag FLG is set to ON, and determines that the forced induction device 120 is not overheated when the overheating flag FLG is set to OFF. If the overheating flag FLG is set to OFF (step S21: NO), the controller 400 proceeds to step S29, which will be described later.

If the overheating flag FLG is set to ON (step S21: YES), the controller 400 acquires the state of charge Vb of the battery 340, and determines whether or not the state of charge Vb is greater than or equal to a specified level Vbth (step S22). The specified level Vbth is a determination value for determining whether or not the battery 340 will be over-discharged when performing motoring, which is a rotation process that drives the first motor generator 150 to rotate the crankshaft 101 of the engine 100.

If the state of charge Vb of the battery 340 is greater than or equal to the specified level Vbth (step S22: YES), the controller 400 performs motoring to rotate the crankshaft 101 with the first motor generator 150 under the condition that the supply of fuel to the engine 100 is stopped (step S23). Here, the controller 400 controls the first motor generator 150 so that the rotation speed of the crankshaft 101 is about the same as the rotation speed when the engine 100 is idling. The controller 400 sets the open degree of the throttle valve 104 to be about the same as that when the engine 100 is idling.

The controller 400 then increments an elapsed time count Tt by "1". The elapsed time count Tt corresponds to the elapsed time from when the motoring started (step S24). Then, the controller 400 determines whether or not the elapsed time count Tt is greater than or equal to a preset time determination value Ttth (step S25). The time determination value Ttth is set to a value corresponding to a predetermined period (e.g., one minute) required to cool the forced induction device 120 when overheated.

If the elapsed time count Tt is less than the time determination value Ttth (step S25: NO), the controller 400 determines that the forced induction device 120 is still overheated, and proceeds to step S23 to continue the motoring. If the elapsed time count Tt is greater than or equal to the time determination value Ttth (step S25: YES), the controller 400 determines that the forced induction device 120 is no longer overheated, terminates the motoring, and proceeds to step S29, which will be described later.

If the state of charge Vb of the battery 340 is lower than the specified level Vbth (step S22: NO), the controller 400 performs a load operation with the engine 100 (step S26) so that motoring does not over-discharge the battery 340. Specifically, the controller 400 continues to supply fuel to the engine 100 and has the first motor generator 150 generate power with the engine torque of the engine 100. In this case, the controller 400 sets the rotation speed of the crankshaft 101 to be the same as or slightly higher than when the engine 100 is idling.

The controller 400 then increments the elapsed time count Tt by "1" (step S27), and determines whether or not the elapsed time count Tt is greater than or equal to the time determination value Ttth (step S28). If the elapsed time count Tt is less than the time determination value Ttth (step S28: NO), the controller 400 determines that the forced induction device 120 is still overheated and proceeds to step S26 to continue the load operation. If the elapsed time count Tt is greater than or equal to the time determination value Ttth (step S28: YES), the controller 400 determines that the forced induction device 120 is no longer overheated, stops the supply of fuel to the engine 100, terminates the load operation, and proceeds to step S29.

In step S29, the controller 400 performs an engine stop process for stopping the rotation of the crankshaft 101 of the engine 100. When the engine 100 is stopped, the controller 400 resets the elapsed time count Tt to "0" (step S30) and terminates the engine stop pre-processing routine.

The operation of the hybrid vehicle in the present embodiment will now be described.

During the operation of the engine 100, the forced induction device 120 may be driven when the vehicle is suddenly accelerated. If the forced induction device 120 is continuously driven, the forced induction device 120 overheats. When the travelling state of the vehicle is shifted from the acceleration state to the constant-speed travelling state, a request to stop the operation of the engine 100 may be issued. In other words, to optimize the usage efficiency of energy that includes fuel and electric power, if determined that the second travelling mode, in which the vehicle is driven with only electric power so that fuel is not consumed, should be performed rather than the first travelling mode, in which the vehicle is driven by consuming fuel, a request to stop the operation of the engine 100 is issued even when the forced induction device 120 is being driven. In the second travelling mode of the present embodiment, the request torque corresponding to the accelerator depression amount of the driver is assumed as the target motor torque, and the second motor generator 160 is driven based on the target motor torque.

In this case, if the state of charge Vb of the battery 340 is higher than or equal to the specified level Vbth, the operation of the engine 100 is immediately stopped, and the vehicle is driven by the second motor generator 160. In this manner, when shifting from the first travelling mode to the second travelling mode, motoring is performed over a predetermined period corresponding to the time determination value Ttth. During this period, the crankshaft 101 of the engine 100 is rotated by driving the first motor generator 150 so that fuel is not consumed. During rotation of the crankshaft 101, the forced induction device 120 is cooled by the gas flowing through the exhaust passage 103, the oil circulated by the engine drive type pump, and the like. After motoring is subsequently terminated, the rotation of the crankshaft 101 is stopped. In other words, the engine 100 is stopped.

Since motoring lowers the state of charge Vb of the battery 340, motoring cannot be performed if the state of charge Vb is low. Thus, in the present embodiment, the load operation of the engine 100 is performed if the state of charge Vb is lower than the specified level Vbth. In other words, the first motor generator 150 generates power with the engine torque of the engine 100 while the motor torque of the second motor generator 160 drives the vehicle. Thus, during the load operation of the engine 100, the crankshaft 101 is rotated at a rotation speed that is about the same as or slightly higher than the rotation speed when the engine 100 is idling. In this case, the intake air amount supplied to the combustion chamber 110 in one intake stroke is relatively small. Thus, the fuel injection amount injected from the injector 105 is also small.

In this case, compared to when the crankshaft 101 is rotated at a high speed, the temperature of the exhaust gas flowing through the exhaust passage 103 is low. As a result, although a certain amount of fuel is consumed in a manner irrelevant to the driving of the vehicle, the load operation of the engine 100 allows for the overheated forced induction device 120 to be cooled. Furthermore, the battery 340 is charged. Such a load operation is performed until the end of the predetermined period from the when the travelling mode of the vehicle is shifted from the first travelling mode to the second travelling mode. Subsequently, when the supply of fuel to the engine 100 is stopped and the load operation is terminated, the rotation of the crankshaft 101 is stopped.

When shifting from the first travelling mode to the second travelling mode, if the forced induction device 120 is not overheated, the motoring and the load operation are not performed, the supply of fuel to the engine 100 is stopped, and the rotation of the crankshaft 101 is stopped.

The engine 100 may also be stopped even when the vehicle is not moving. In such a case, if the forced induction device 120 is overheated, the process for cooling the forced induction device 120 is performed before stopping the rotation of the crankshaft 101. Specifically, when the state of charge Vb of the battery 340 is high, the engine 100 is stopped after the motoring is performed. If the state of charge Vb is low, the engine 100 is stopped after the load operation is performed.

As described above, the present embodiment has the following advantages.

(1) When a request to stop the operation of the engine 100 is issued, motoring is performed if the forced induction device 120 is overheated and the forced induction device 120 is cooled while motoring is being performed. Then, the rotation of the crankshaft 101 is stopped. This restricts stopping of the engine 100 when the forced induction device 120 is overheated. Furthermore, fuel is not consumed to cool the forced induction device 120. Thus, the consumption of fuel in a manner irrelevant to the driving of the vehicle is limited. Therefore, overheating of the forced induction device 120 may be limited without increasing the fuel consumption of the vehicle.

Even when a request to stop the operation of the engine 100 is issued, motoring and a load operation are not performed if the forced induction device 120 is not overheated. Thus, the engine 100 can be immediately stopped.

(2) In the present embodiment, even when a request to stop the operation of the engine 100 is issued when the vehicle is travelling, motoring is performed if the forced induction device 120 is overheated. This suppresses overheating of the forced induction device 120 without increasing the fuel consumption of the vehicle even when the vehicle is travelling.

(3) Since motoring consumes electric power, motoring is not performed when the state of charge Vb of the battery 340 is low. Thus, when the state of charge Vb of the battery 340 is low, the load operation is performed instead of motoring. When the state of charge Vb of the battery 340 is low, a certain amount of fuel is consumed in a manner irrelevant to the driving of the vehicle. However, the temperature of the forced induction device 120 is lowered while raising the state of charge Vb of the battery 340.

(4) The hybrid system 10 of the present embodiment includes the two motor generators 150 and 160. Thus, the load operation may be performed while keeping the engine speed low even when the vehicle is travelling. More specifically, compared to when a load operation is performed when the engine speed is high, the temperature of the exhaust gas flowing through the exhaust passage 103 is decreased. Thus, the cooling efficiency of the forced induction device 120 in the load operation may be increased.

Second Embodiment

A second embodiment of the present invention will now be described with reference to FIGS. 4 and 5. The second embodiment differs from the first embodiment in the hybrid system and the engine stop pre-processing routine. Therefore, the description hereafter will focus on the differences from the first embodiment. Same reference numerals are given to those components that are the same as the corresponding components of the first embodiment. Such components will not be described.

Figure 4:
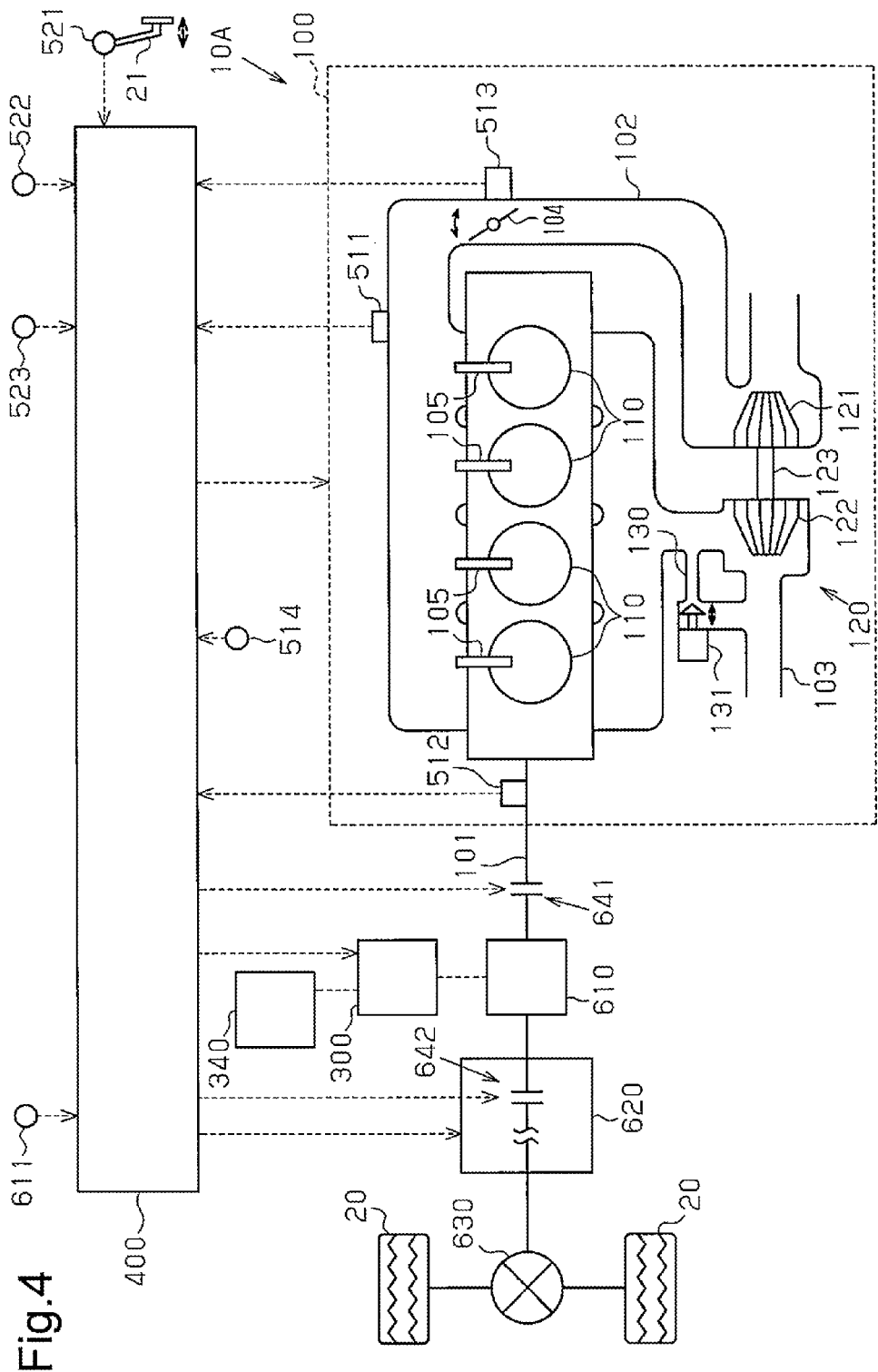
FIG. 4 is a schematic diagram showing a hybrid vehicle and a controller of the hybrid vehicle according to a second embodiment of the present invention.

As shown in FIG. 4, a hybrid system 10A of the present embodiment includes the engine 100, a motor generator 610, an automatic transmission 620, and a differential 630. The motor generator 610 not only functions to drive the vehicle but also functions to perform motoring.

A hydraulic-driven first clutch 641 is located between the engine 100 and the motor generator 610. The first clutch 641 regulates a control hydraulic pressure to regulate the torque transmission efficiency between the engine 100 and the motor generator 610. A hydraulic-driven second clutch 642 is located at the input side of the automatic transmission 620, that is, the side of the motor generator 610. The second clutch 642 regulates a control hydraulic pressure to regulate the torque transmission efficiency.

A condition in which the torque transmission efficiency of each of the clutches 641 and 642 is maximum is referred to as a "fully engaged position", and a state in which the torque transmission is prohibited is referred to as a "released position". Furthermore, a state in which the torque transmission efficiency is lower than maximum but not in the released position is referred to as a "half-engaged position".

The controller 400 that controls the hybrid system 10A will now be described.

A rotation sensor 611 for detecting the rotation speed of the motor generator 610 is electrically connected to the controller 400 of the present embodiment. The controller 400 controls the motor generator 610 through the inverter 300 based on a set output request to the motor generator 610 and the rotation speed of the motor generator 610 detected from the detection signal of the rotation sensor 611.

The controller 400 executes fuel injection control, ignition timing control, and intake air amount control on the engine and boost pressure control on the forced induction device 120 in accordance with a set output request to the engine 100 and the intake air amount, the engine speed, the open degree of the throttle valve 104, and the boost pressure detected from the detection signals of the sensors 511, 512, 513, and 514.

The controller 400 calculates the request torque that is to be output to the differential 630 based on the accelerator depression amount, the shift position, and the vehicle speed detected from the detection signals of the sensors 521, 522, and 523. The controller 400 controls the engine 100, the motor generator 610, and the automatic transmission 620 so that the request power corresponding to the calculated request torque is output to the differential 630.

Various drive modes of the hybrid system 10A of the present embodiment will now be described.

An EV mode in which the first clutch 641 is in the released position and an HEV mode in which the first clutch 641 is in the engaged position are set in advance for the hybrid system 10A. Here, "EV" is the acronym for "Electric Vehicle", and "HEV" is the acronym for "Hybrid Electric Vehicle". The "engaged position" includes the fully engaged position and the half-engaged position.

The EV mode is a drive mode that is basically selected when the state of charge Vb of the battery 340 is high enough and when the vehicle is decelerating or the like. For example, when the driver is depressing the accelerator pedal 21, the controller 400 controls the motor generator 610 so that the target motor torque of the motor generator 610 is the request torque corresponding to the accelerator depression amount of the driver. When the driver is not depressing the accelerator pedal 21 but depressing the brake pedal, the controller 400 generates regenerative energy with the motor generator 610 and stores the electric power generated by the motor generator 610 in the battery 340. When the drive mode is the EV mode, the operation of the engine 100 is basically stopped.

The HEV mode is a drive mode basically selected when operating the engine 100. For example, when driving the vehicle with only the engine torque of the engine 100, the controller 400 controls the engine 100 so that the target engine torque of the engine 100 is the request torque corresponding to the accelerator depression amount of the driver. When driving the vehicle with the engine torque of the engine 100 and the motor torque of the motor generator 610, the controller 400 controls the engine 100 and the motor generator 610 so that the total value of the target engine torque of the engine 100 and the target motor torque of the motor generator 610 matches the request torque corresponding to the accelerator depression amount. If the vehicle is required to undergo sudden acceleration when the drive mode is in the HEV mode, the controller 400 may increase the boost pressure produced by the forced induction device 120.

Furthermore, when the motor generator 610 generates power with the engine torque of the engine 100, the controller 400 controls the engine 100 and the motor generator 610 using a target engine torque that is the total value of the request toque corresponding to the accelerator depression amount and the power generation torque required for power generation in the motor generator 610. In this case, if the vehicle is stopped, the controller 400 shifts the second clutch 642 to the released position so that engine torque is not transmitted to the drive wheels 20 or shifts the second clutch 642 to the half-engaged position so that the engine torque cannot be easily transmitted to the drive wheels 20.

An engine stop pre-processing routine that is executed by the controller 400 when a request to stop the engine 100 is issued will now be described with reference to the flowchart of FIG. 5.

In the engine stop pre-processing routine shown in FIG. 5, the controller 400 determines whether or not the forced induction device 120 is overheated, that is, whether or not the overheating flag FLG is set to ON (step S51). If the overheating flag FLG is set to OFF (step S51: NO), the controller 400 terminates the engine stop pre-processing routine. Then, the controller 400 stops the supply of fuel to the engine 100. When the vehicle is travelling, the controller 400 shifts the first clutch 641 to the released position and stops the rotation of the crankshaft 101.

If the overheating flag FLG is set to ON (step S51: YES), the controller 400 determines whether or not the state of charge Vg of the battery 340 is higher than or equal to the specified level Vbth (step S52). If the state of charge Vb is higher than or equal to the specified level Vbth (step S52: YES), the controller 400 determines whether or not the vehicle has stopped travelling based on the detection signal from the vehicle speed sensor 523 (step S53).

If the vehicle has stopped travelling (step S53: YES), the controller 400 shifts the second clutch 642 to the released position (step S54). Then, the controller 400 performs motoring, which is a rotation process that rotates the crankshaft 101 with the motor generator 610, under the condition that the supply of fuel to the engine 100 has been stopped (step S55). In this case, the controller 400 controls the motor generator 610 so that the rotation speed of the crankshaft 101 is about the same as the rotation speed when the engine 100 is idling. The controller 400 assumes that the open degree of the throttle valve 104 is about the same as that when the engine 100 is idling. The controller 400 then increments the elapsed time count Tt by "1". The elapsed time count Tt corresponds to the elapsed time from when the motoring started (step S56). Then, the controller 400 determines whether or not the elapsed time count Tt is greater than or equal to the time determination value Ttth corresponding to a predetermined period (step S57).

If the elapsed time count Tt is less than the time determination value Ttth (step S57: NO), the controller 400 proceeds to step S55 and continues the motoring. If the elapsed time count Tt is greater than or equal to the time determination value Ttth (step S57: YES), the controller 400 stops driving the motor generator 610, and shifts the first clutch 641 to the released position (step S58). This ends the motoring and stops the rotation of the crankshaft 101 of the engine 100. Then, the controller 400 resets the elapsed time count Tt to "0" (step S59) and terminates the engine stop pre-processing routine.

If the vehicle has not stopped travelling (step S53: NO), the controller 400 stops the supply of fuel to the engine 100 (step S60). The controller 400 then shifts the first clutch 641 to the half-engaged position to lower the transmission efficiency of the motor torque from the motor generator 610 to the engine 100 (step S61). In this case, the motor generator 610 drives the vehicle. Thus, the crankshaft 101 is rotated by the motor torque of the motor generator 610. During motoring, the controller 400 may feedback-control the control hydraulic pressure of the first clutch 641 so that the rotation speed of the crankshaft 101 is about the same as when the engine 100 is idling.

The controller 400 increments the elapsed time count Tt by "1" (step S62). The elapsed time count Tt corresponds to the elapsed time from when the travelling mode shifts from the first travelling mode to the second travelling mode. Then, the controller 400 determines whether or not the elapsed time count Tt is greater than or equal to the time determination value Ttth (step S63). If the elapsed time count Tt is smaller than the time determination value Ttth (step S63: NO), the controller 400 proceeds to step S61 and continues the motoring. If the elapsed time count Tt is greater than or equal to the time determination value Ttth (step S63: YES), the controller 400 shifts the first clutch 641 to the released position and terminates the motoring (step S64). This stops the rotation of the crankshaft 101 of the engine 100. Then, the controller 400 resets the elapsed time count Tt to "0" (step S65) and terminates the engine stop pre-processing routine.

If the state of charge Vb of the battery 340 is lower than the specified level Vbth (step S52: NO), the controller 400 determines whether or not the vehicle has stopped travelling based on the detection signal from the vehicle speed sensor 523 (Step S66). If the vehicle has not stopped travelling (step S66: NO), the controller 400 prohibits the stopping of the operation of the engine 100 (step S67) and terminates the pre-engine stop process. In other words, when the state of charge Vb of the battery 340 is low, the controller 400 prohibits shifting of the travelling mode from the first travelling mode, which drives the vehicle with the engine 100, to the second travelling mode, which stops the operation of the engine 100 and drives the vehicle with the motor generator 610.

If the vehicle has stopped travelling (step S66: YES), the controller 400 shifts the second clutch 642 to the released position so that the engine torque is not transmitted to the drive wheel 20 (step S68). The controller 400 then performs a load operation with the engine 100 (step S69). Specifically, the controller 400 shifts the first clutch 641 to the fully engaged position, and has the motor generator 610 generate power with the engine torque form the engine 100.

The controller 400 then increments the elapsed time count Tt by "1" (step S70). The elapsed time count Tt corresponds to the elapsed time from when the load operation started. Then, the controller 400 determines whether or not the elapsed time count Tt is greater than or equal to the time determination value Ttth (step S71). If the elapsed time count Tt is less than the time determination value Ttth (step S71: NO), the controller 40 proceeds to step S69, and continues the load operation. If the elapsed time count Tt is greater than or equal to the time determination value Ttth (step S71: YES), the controller 400 stops the supply of fuel to the engine 100, that is, stops the load operation and the rotation of the crankshaft 101 (step S72). Then, the controller 400 resets the elapsed time count Tt to "0" (step S73) and terminates the engine stop pre-processing routine.

The operation of the hybrid vehicle in the present embodiment will now be described.

During the operation of the engine 100, the forced induction device 120 may be driven such as when the vehicle is suddenly accelerated. If the forced induction device 120 is continuously driven, the forced induction device 120 overheats. When the travelling state of the vehicle is shifted from the acceleration state to the constant-speed travelling state, a request to stop the operation of the engine 100 may be issued. In other words, to optimize the usage efficiency of energy that includes fuel and electric power, if determined that the second travelling mode, in which the vehicle is driven with only electric power so that fuel is not consumed, should be performed rather than the first travelling mode, in which the vehicle is driven by consuming fuel, a request to stop the operation of the engine 100 is issued even when the forced induction device 120 is being driven.

In this case, if the state of charge Vb of the battery 340 is higher than or equal to the specified level Vbth, motoring is performed for a predetermined period corresponding to the time determination value Ttth. Specifically, the first clutch 641 is shifted to the half-engaged position, and the supply of fuel to the engine 100 is then stopped. The motor torque from the motor generator 610 is then slightly transmitted to the crankshaft 101 of the engine 100 so that the crankshaft 101 is rotated. While the crankshaft 101 is rotated by the motoring, the forced induction device 120 is cooled by the gas flowing through the exhaust passage 103, the oil circulated by the engine drive type pump, and the like. When the predetermined period ends, the first clutch is shifted to the released position and the motoring is terminated. This stops the rotation of the crankshaft 101.

Since the motoring lowers the state of charge Vb of the battery 340, the motoring cannot be performed if the state of charge Vb is low. Furthermore, the hybrid system 10A of the present embodiment includes only one motor generator, as opposed to the hybrid system 10 of the first embodiment. Thus, if the state of charge Vb of the battery 340 is low when the vehicle is travelling, the stopping of the operation of the engine 100 is prohibited. In other words, even if it is preferable that the operation of the engine 100 be stopped to drive the vehicle with the motor generator 610 in order to optimize the usage efficiency of the energy, the vehicle is continuously driven by the engine torque of the engine 100.

If a request to stop the operation of the engine 100 is issued when the vehicle stops travelling, the second clutch 642 is shifted to the released position and the supply of fuel to the engine 100 is stopped if the state of charge Vb of the battery 340 is high. Then, motoring is started to transmit the motor torque of the motor generator 610 to the crankshaft 101 of the engine 100 through the first clutch 641. When the motoring rotates the crankshaft 101, the forced induction device 120 is cooled by the gas flowing through the exhaust passage 103, the oil circulated by the engine drive type pump, and the like. When the predetermined period ends, the first clutch is in the released position and the motoring is terminated. This stops the rotation of the crankshaft 101.

If the state of charge Vb of the battery 340 is low, the supply of fuel to the engine 100 is continued for a while even if the vehicle is stopped. In this case, however, a load operation is performed so that the motor generator 610 generates power with the engine torque. This promotes cooling of the forced induction device 120, while raising the state of charge Vb of the battery 340. When the supply of fuel to the engine 100 is stopped and the load operation is terminated, the rotation of the crankshaft 101 is stopped.

As described above, the present embodiment further has the following advantages in addition to advantages (1) and (2) of the first embodiment.

(5) Since motoring consumes electric power, motoring is not performed when the state of charge of the battery 340 is low. Thus, if the state of charge Vb of the battery 340 is low when the vehicle stops travelling, a load operation is performed instead of motoring. Thus, if the state of charge Vb of the battery 340 is low, a certain amount of fuel is consumed in a manner irrelevant to the driving of the vehicle. However, the temperature of the forced induction device 120 may be lowered while raising the state of charge Vb of the battery 340.

(6) If the state of charge Vb of the battery 340 is low when the vehicle is travelling, the stopping of the operation of the engine 100 is prohibited. Thus, the rotation of the crankshaft 101 is less likely to be stopped when the forced induction device 120 is overheated.

Each of the embodiments described above may be modified as described below.

In each embodiment, other determination methods that do not use the boost pressure Pt may be employed to determine whether or not the forced induction device 120 is overheated. For example, the intake air amount or the changing amount of the intake air amount obtained from the detection signal of the air flowmeter 511 may be used to estimate whether or not the forced induction device 120 is driven, and the forced induction device 120 may be determined as being overheated when the forced induction device 120 is driven over a long period.

It may be estimated whether or not the forced induction device 120 is driven based on an operation point (target engine torque, target engine speed) of the engine 100 set in the controller 400, and it may be determined that the forced induction device 120 is overheated when the forced induction device 120 is driven over a long period.

When a sensor for detecting the temperature of the exhaust gas flowing through the exhaust passage 103 is arranged in the vehicle, it may be determined whether or not the forced induction device 120 is driven from the temperature of the exhaust gas based on the detection signal of the sensor, and it may be determined that the forced induction device 120 is overheated when the forced induction device 120 is driven over a long period.

Furthermore, if a sensor for detecting the rotation speed of the turbine wheel 122 or the compressor wheel 121 of the forced induction device 120 is used, it may be estimated whether or not the forced induction device 120 is driven based on the detection signal of the sensor, and it may be determined that the forced induction device 120 is overheated when the forced induction device 120 is driven over a long period.

In the second embodiment, when stopping the engine 100 while the vehicle is travelling, motoring may be performed with the first clutch 641 in the fully engaged position if the state of charge Vb of the battery 340 is high. In this case, the target motor torque of the motor generator 610 is set to a larger value compared to the second embodiment.

In the second embodiment, if the state of charge Vb of the battery 340 is low, the stopping of the operation of the engine 100 may be prohibited even when the vehicle stops travelling.

In the first embodiment, when stopping the engine 100, the power generation torque of the first motor generator 150 may be set to a large value and a load operation may be performed if the state of charge Vb of the battery 340 is low. If the state of charge Vb becomes higher than or equal to the specified level Vbth during the load operation, the load operation may be switched to motoring. In this case, the total value of the execution time of the load operation and the execution time of the motoring may be coincided with a predetermined period. Alternatively, motoring may be executed for a predetermined period irrespective of the length of the execution time of the load operation.

In each embodiment, the time determination value when performing motoring may differ from the time determination value when performing a load operation. For example, the time determination value when performing a load operation may be set as a value larger than the time determination value when performing motoring. This is because the temperature of the gas flowing through the exhaust passage 103 during a load operation is higher than the temperature of the gas flowing through the exhaust passage 103 during motoring.

In each embodiment, the specified level Vbth may be set in accordance with the travelling state of the vehicle. For example, the specified level when the vehicle is travelling may be set as a value greater than the specified level of when the vehicle is stopped.

In the second embodiment, the motor generator 610 does not have to be driven in the rotation process. For example, the automatic transmission 620 allows power to be transmitted from the drive wheel 20 to the second clutch 642 by setting the gear to the first gear, and setting each of the first and second clutches 641 and 642 at the engaged position. The crankshaft 101 is then rotated by the power used to rotate the drive wheels 20. The temperature of the forced induction device 120 can be lowered by performing such a rotation process.

The hybrid system may be any other system other than the hybrid systems 10 and 10A of the first and second embodiments as long as a motor is used to rotate the crankshaft 101. For example, the hybrid system may be a system that includes a power generator, which generates power based on the engine torque of the engine 100, and separate motor, which is driven to rotate the crankshaft 101.

DESCRIPTION OF REFERENCE CHARACTERS 100 engine
101 crankshaft
120 forced induction device
150, 160, 610 motor generator
340 battery

400 controller
641 first clutch

The invention claimed is:

1. A control device, including a computer configured with executable program logic, for a hybrid vehicle provided with an engine including an exhaust gas type forced induction device and a motor coupled to an output shaft of the engine, wherein the motor has a power generating function for generating power with torque of the engine, and the power generated by the motor is stored in a battery;

when stopping the engine under a situation in which the forced induction device is overheated, if a state of charge of the battery is higher than or equal to a specified level, the control device is configured to perform motoring that rotates the output shaft with the motor under a condition in which supply of fuel to the engine is stopped and then end the motoring, and if the state of charge of the battery is lower than the specified level, the control device is configured to perform a load operation with the engine to have the motor generate power with the torque of the engine before stopping the supply of fuel to the engine to stop the engine.

2. The control device for the hybrid vehicle according to claim 1, wherein the hybrid vehicle includes one or more motors serving as the motor; and when shifting a travelling mode of the vehicle from a first travelling mode, which drives the vehicle with the engine, to a second travelling mode, which stops the supply of fuel to the engine and drives the vehicle with the motor, under a situation in which the forced induction device is overheated when the vehicle is travelling, if the state of charge of the battery is higher than or equal to the specified level, the control device is configured to perform the motoring until a predetermined period elapses from when the travelling mode is shifted and then end the motoring, and if the state of charge of the battery is lower than the specified level, the control device is configured to perform the load operation with the engine until a predetermined period elapses from when the travelling mode is shifted and then stop the supply of fuel to the engine to stop the engine.

3. The control device for the hybrid vehicle according to claim 2, wherein the motors of the hybrid vehicle include a motor used to drive the vehicle and a motor used for the motoring that differs from the motor used to drive the vehicle.

4. The control device for the hybrid vehicle according to claim 2, wherein the hybrid vehicle includes a clutch configured to vary efficiency for transmitting torque from the motor to the output shaft of the engine; and when stopping the engine under a situation in which the forced induction device is overheated, if the state of charge of the battery is higher than or equal to the specified level, the control device is configured to perform the motoring that transmits torque from the motor to the output shaft through the clutch under the condition that the supply of fuel to the engine is stopped, and then prohibits the transmission of torque from the motor to the output shaft through the clutch to stop the engine.

5. The control device for the hybrid vehicle according to claim 4, wherein if the state of charge of the battery is lower than the specified level when the hybrid vehicle is travelling, the control device is configured to prohibit stopping of the supply of fuel to the engine.

6. The control device for the hybrid vehicle according to claim 1, wherein the control device is configured to determine whether or not the probability of the forced induction device being overheated is high based on an operation status of the forced induction device.

* * * * *